United States Patent [19]

Lin

[11] Patent Number: 4,981,040
[45] Date of Patent: Jan. 1, 1991

[54] SIGHT FLOW INDICATION APPARATUS WITH MULTI-SEALING PROTECTIVE ARRANGEMENTS

[76] Inventor: Jack Lin, No. 413, Sec. 1, Fu-Hsing Rd., Taichung, Taiwan

[21] Appl. No.: 440,990

[22] Filed: Nov. 22, 1989

[51] Int. Cl.⁵ ............................................. G01F 23/02
[52] U.S. Cl. ........................................ 73/323; 73/328
[58] Field of Search .................. 73/323, 324; 116/276; 220/82 A; 285/45, 93; 350/319

[56] References Cited

U.S. PATENT DOCUMENTS

| | | | |
|---|---|---|---|
| 3,046,785 | 7/1962 | Au Werter | 73/325 |
| 3,375,802 | 4/1968 | Lazarre | 116/276 |
| 3,837,226 | 9/1974 | Kawawa | 220/82 A |
| 4,877,668 | 10/1989 | Hinz et al. | 73/323 |
| 4,888,990 | 12/1989 | Bryan et al. | 73/325 |

*Primary Examiner*—Daniel M. Yasich
*Attorney, Agent, or Firm*—Pasquale A. Razzano

[57] ABSTRACT

A sight flow indication apparatus with multi-sealing protective arrangements includes: an upper and a lower flange coupling member, each member having a stuffing box formed therein; a first and a second gland member each having a gland pipe portion formed in conjunction with the stuffing boxes; a transparent sight flow tube, the periphery of which has a layer of a thin film of a transparent protective material disposed thereon, tightly secured in the stuffing boxes between the upper and lower flange coupling members through the first and second gland members and a plurality of gasket members; and a plurality of gland packing members respectively disposed in the stuffing boxes in connection with the first and second gland members and the transparent sight flow tube; whereby, when the first and second gland members and the transparent sight flow tube are tightly fastened between the upper and lower flange coupling members, effective means of sealing protection are achieved accordingly.

5 Claims, 4 Drawing Sheets

SIGHT FLOW INDICATION APPARATUS WITH MULTI-SEALING PROTECTIVE ARRANGEMENTS

BACKGROUND OF THE INVENTION

This invention relates to a sight flow indication apparatus, and particularly to a kind of sight flow indication apparatus having a plurality of protective arrangements respectively provided therewith so as to ensure that no oozing or leakage of the liquid material contained therein will occur when an unexpected deficiency is caused thereto.

In a petrochemical industry or other chemical engineering facilities where great amounts of liquid products have to be processed, piping arrangements are usually provided to transfer the liquid products therefrom. In order to clearly understand whether the flow of the liquid products in the piping arrangements is normal or abnormal, or is cut off, and to ensure regular operations and prevent accidental injuries and/or damages, sight flow indicators, which are generally formed from a transparent glass tube, are respectively installed at an important and a clear portion of the piping arrangements for performing routine visual checks thereat. A conventional sight flow indicator is shown in FIG. 1. this indicator has the following defects:

(a) The glass tube 1 of a conventional sight flow indicator "A" is tightly secured between two flanged joints 2 by a pair of lock bolts 3 which are screw-fastened at the lower flange 2a of both flanged joints 2. Since the horizontal plane at the opposing ends of the glass tube 1 are neither evenly flat nor absolutely parallel, an end-seal gasket 11 is normally provided between the opposing end planes of the glass tube 1 and the annular surfaces of the lower flanges 2a. After a certain duration, however, leakage, contamination and even public hazards may occur due to the corrosion and infiltration of the chemical liquid through the end-seal gaskets 11.

(b) In order to obtain a premium tight connection between the tube 1 and the lower flanges 2a, the lock bolts 3 are fastened to the utmost limit of tension thereof through the nuts 31. Since the end-seal gaskets 11 are tightly pressed by the ends of the glass tubes 1, there is no leeway for the expansion and contraction of for the glass tubes 1 under hot and cold conditions. As a result, the edges of the glass tubes 1 often crack under high pressure, causing the chemical liquid in the glass tubes 1 to ooze out of the cracks therein. On the other hand, in order to avoid the cracking of the glass tubes 1 as mentioned above, the method of loosely fastening glass tubes 1 at both ends thereof is used, creating a clearance between the end surface of the glass tubes 1 and the end-seal gaskets 11. However, with this method, due to the surge pressure of the flowing liquid in the glass tubes 1, oozing or leakage of said liquid may occur from the clearance. If the liquid in the glass tubes 1 is poisonous, a very dangerous situation would result.

SUMMARY OF THE INVENTION

It is accordingly a primary object of the present invention to provide a sight flow indication apparatus with multi-sealing protective arrangements by which sight flow tubes can be tightly fastened to prevent leakage without causing any cracks to said sight flow tubes.

It is another object of the present invention to provide a sight flow indication apparatus with multi-sealing protective arrangements by which if the sight flow tubes are accidentally cracked, oozing or leakage of the liquid from the cracks can be prevented, allowing sufficient time to take remedial actions.

These and other objects of the present invention are achieved by the provision of a sight flow indication apparatus with multi-sealing protective arrangements which comprises: an upper and a lower identical flange coupling member, each member having a stuffing box formed in the middle portion thereof, a flange plate (also called a flange coupling plate) provided at one end of said stuffing box and a joint flange (also called a joint flange plate) located at the other end thereof; a first and a second identical gland member, each one having a gland pipe portion formed in conjunction with the stuffing boxes of said upper and lower flange coupling members, and a pair of lugs symmetrically extending at one end of each gland pipe portion for being separately fastened onto the joint flanges of said upper and lower flange coupling members via setting screws; a transparent sight flow tube, the periphery of which has a layer composed of thin film of transparent protective layer of chemical material disposed thereon, tightly secured in the respective stuffing boxes between said upper and lower flange coupling members through said first and second gland members via locating lock bolts; a plurality of gland packing members respectively disposed in the stuffing boxes of said upper and lower coupling members in connection with the gland pipe portions of said first and second gland members and the end portions of said transparent sight flow tube for providing an effective seal protection therewith; and a plurality of gasket members separately disposed in the stuffing boxes of said upper and lower flange coupling members in conjunction with both ends of said transparent sight flow tube for effecting a close seal therewith; whereby, when the transparent sight flow tube and the first and second gland members are tightly fastened between the upper and lower flange coupling members, multiple protection against any leakage of the sight flow indication apparatus is achieved accordingly.

Other advantages and characteristics of the present invention will become apparent from the following detailed description of a preferred embodiment when read in conjunction with the accompanying drawings.

DETAILED DESCRIPTION OF THE PREFERRED EMBODIMENT

Figure 1:
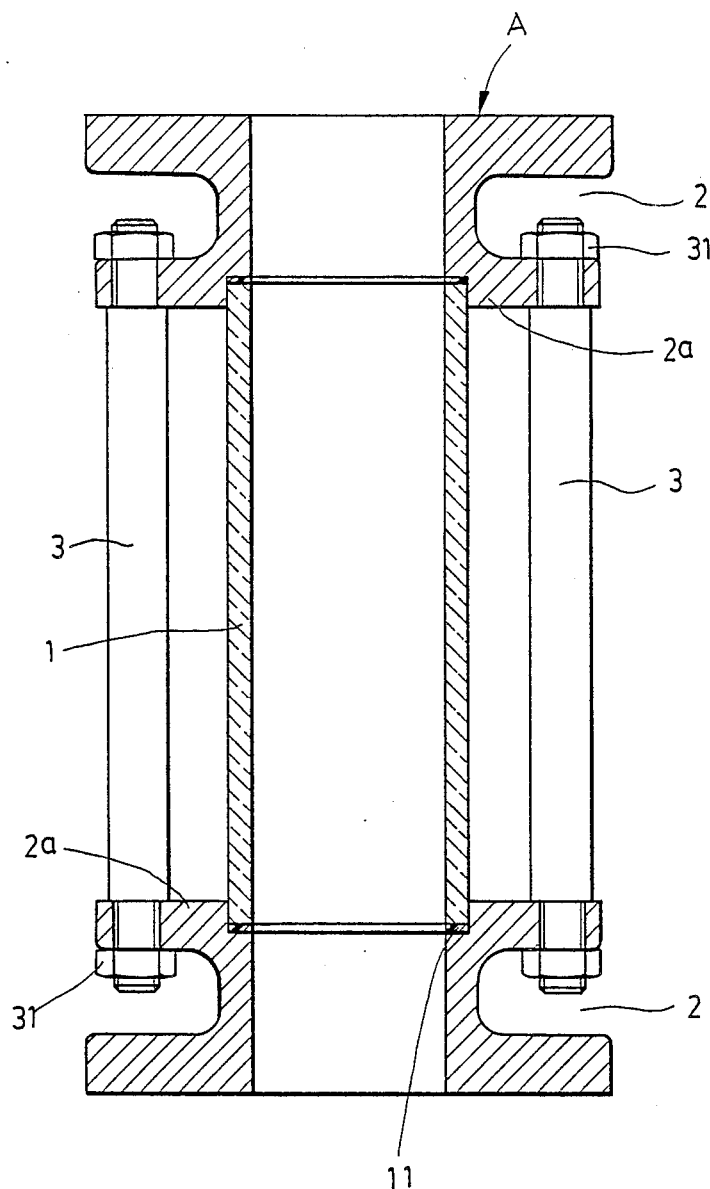
FIG. 1 is a sectional view of a conventional prior art sight flow indicator.
Figure 2:
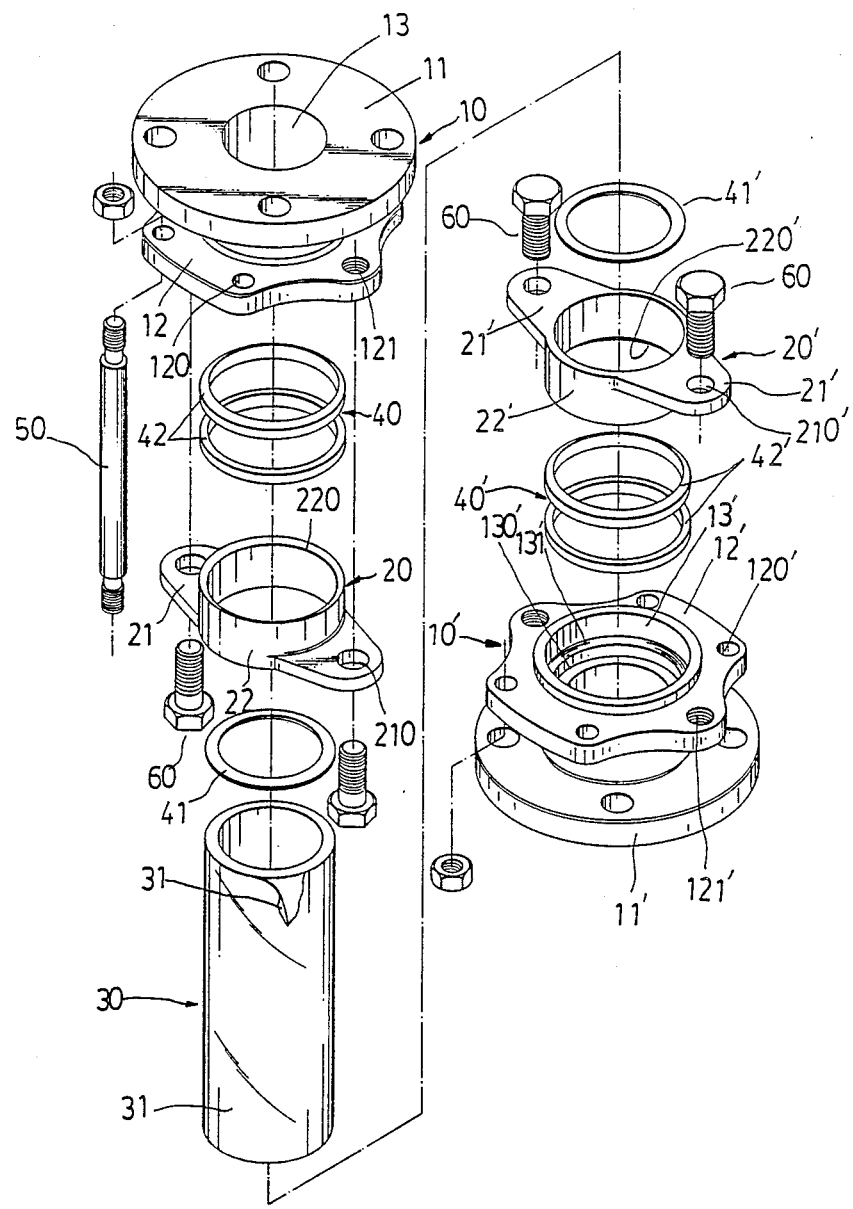
FIG. 2 is a perspective and an exploded view of a preferred embodiment of a sight flow indication apparatus with multi-sealing protective arrangements according to the present invention.

Referring to FIG. 2, the preferred embodiment of a sight flow indication apparatus with multi-sealing protective arrangements according to the present invention comprises: an upper and a lower identical flange coupling member 10, 10', each member having a stuffing box 13, (13') formed in the middle portion thereof, a flange plate 11, (11') provided at one end of said stuffing box 13, (13'), and a joint flange 12, (12'), located at the other end thereof; a first and a second identical gland member 20, 20', each having a gland pipe portion 22, (22') formed in conjunction with the stuffing boxes 13, 13' of said upper and lower flange coupling members 10, 10', and a pair of lugs 21, (21'), each having an opening 210, (210') located in one end thereof, symmetrically extending at one end of the gland pipe portion 22, (22'); a transparent sight flow tube 30, having a layer 31 composed of a thin film of transparent protective chemical material, such as PCFTE (polychlorotrifluoroethylene) otherwise known as "Teflon", disposed around the outer periphery thereof, for being tightly secured between said upper and lower flange coupling members 10, 10' through said first and second gland members 20, 20' by means of a plurality of locating lock bolts 50, (only one of which is shown in FIG. 1); a plurality of gland packing members 40, 40' formed in conjunction with the stuffing boxes 13, 13' of said upper and lower coupling members 10, 10' for being respectively disposed in said stuffing boxes 13, 13' in connection with the gland pipe portions of said first and second sealing gland members; and a first and a second gasket members 41, 41' formed in conjunction with the stuffing boxes 13, 13' of said upper and lower coupling members 10, 10' for being used in connection with said sight flow tube 30.

As shown in FIG. 2, each one of the stuffing boxes 13, 13' of said upper and lower coupling members 10, 10' is formed with an appropriate depth, having a larger opening created at one end thereof in conjunction with the outer peripheries of the pipe portions 22, 22' of said first and second gland members 20, 20', a smaller opening located at the other end thereof, and a tapered shoulder 131, (131'), as a flat shoulder 130, (130'), is provided on the inner wall of each one of the larger and smaller openings of said stuffing boxes 13, 13', wherein the outer diameter of said flat shoulders 130, 130' is slightly larger (about 1 mm) than the external diameter of said transparent sight flow tube, 30. In addition, a plurality of screw holes 121, 121' and bolt openings 120, 120' are respectively provided in the joint flanges 12, 12' of said upper and lower coupling members 10, 10'. Moreover, the external diameter of the gland pipe portions 22, 22' of each one of said first and second gland members 20, 20' is slightly smaller than the internal diameter of the larger opening of each one of said stuffing boxes 13, 13' so as to enable said gland pipe portions 22, 22' to be slidably fitted into the larger openings of said stuffing boxes 13, 13' while the internal diameter of said gland pipe portions 22, 22' is slightly larger than the external diameter of said transparent sight flow tube 30. Moreover, each one of the gland pipe portions 22, 22' has a tapered plane 220, (220') formed along the open edge thereof in conjunction with said gland packing members 40, 40' and the tapered shoulders 131, 131' of said stuffing boxes 13, 13'.

Figure 3:
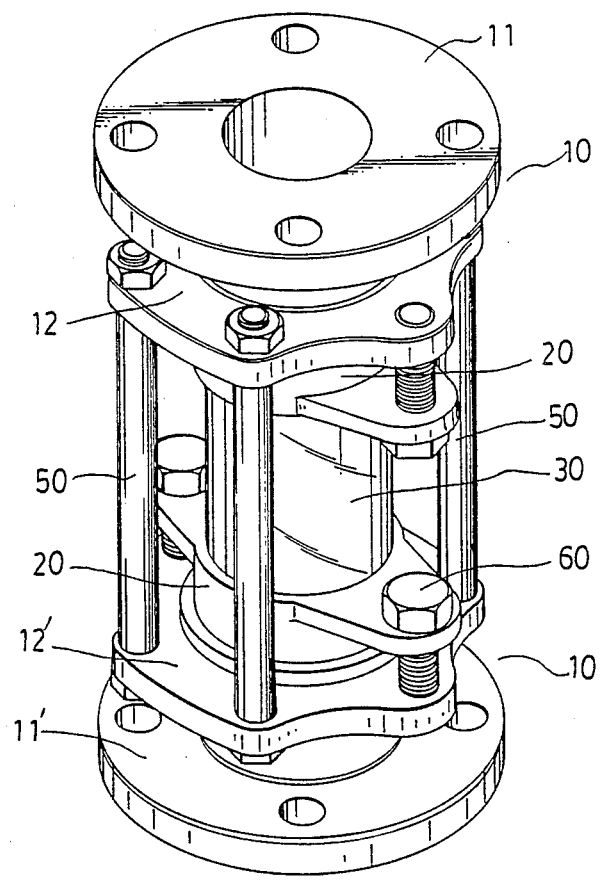
FIG. 3 is a perspective view of the assembled preferred embodiment of FIG. 2.
Figure 4:
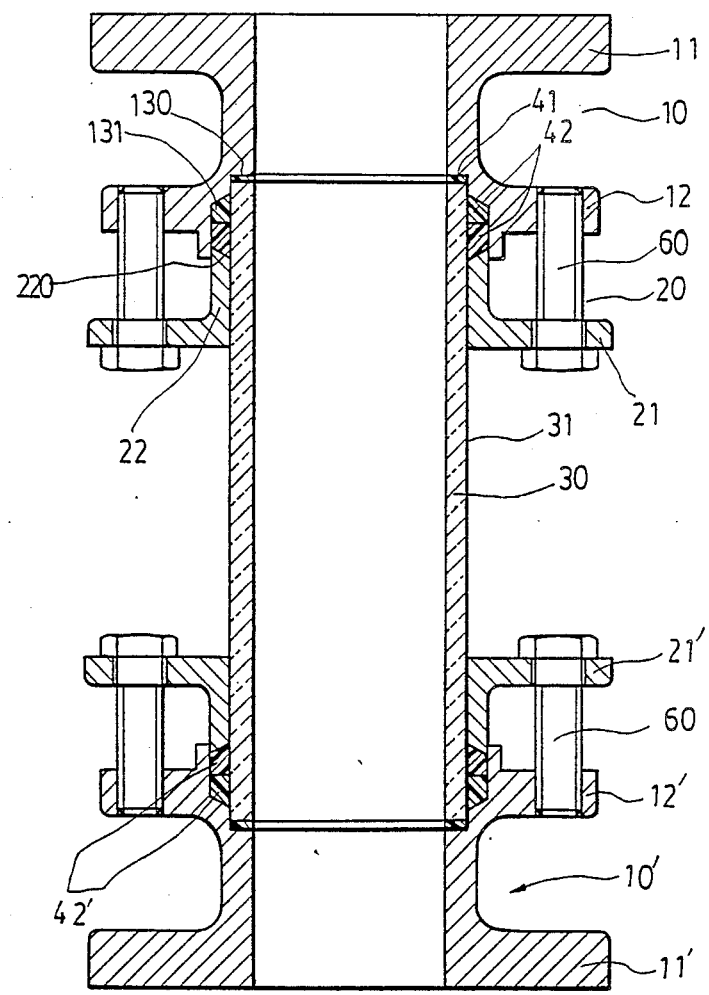
FIG. 4 is a sectional view of the assembled preferred embodiment shown in FIG. 3.

Referring to FIGS. 3 and 4, the assembly operations of the above-described embodiment are as follows:

The first and second gasket members 41, 41' are separately positioned on the flat surface and around the upper wall of the flat shoulders 130, 130' of said stuffing boxes 13, 13'; the first and second gland members 20, 20' are respectively sleeved around the opposing end portions of said transparent sight flow tube 30 from the gland pipe portions 22, 22' at which the lugs 21, 21' are symmetrically located; the first and second gland packing members 40' 40', each having a pair of tapered packing rings 42, 42' which are formed to match with each other, are respectively disposed in the larger openings of said stuffing boxes 13', 13' around the tapered shoulders 131, 131' thereof; then, the opposing end portions of said transparent sight flow tube 30, together with the gland pipe portions 22, 22', are separately inserted into the stuffing boxes 13, 13' of said upper and lower flange coupling members 10, 10' through the gland packing members 40, 40' until both end edges of said transparent sight flow tube 30 are abutted upon the gasket members 41 therearound and against the flat shoulders 130, 130' of said stuffing boxes 13, 13', (it shall be appreciated that since the diameter of the flat shoulders 130, 130' of said stuffing boxes 13, 13' is slightly larger than the external diameter of said transparent sight flow tube 30, the clearance between the inner wall of said flat shoulders 130, 130' and the external wall of said sight flow tube 30 is just suitable for receiving the gasket members 41, 41' therein); and following the insertion of said sight flow tube 30, the locating lock bolts 50 are respectively fastened through the bolt openings 120, 120' of the joint flanges 12, 12' of said upper and lower flange coupling members 10, 10', as shown in FIG. 3. As a result, both end edges of said transparent sight flow tube 30 are tightly secured in the stuffing boxes 13, 13' and closely sealed against the flat shoulders 130, 130' thereof, (as shown in FIG. 2), resulting in the achievement of the first protective level of the preferred embodiment.

Finally, the setting screws 60 are respectively connected to the joint flanges 12, 12' of said upper and lower flange coupling members 10, 10' via the openings 210, 210' of the lugs 21, 21' of said gland packing members 20, 20' and the screw holes 121, 121' of the joint flanges 12, 12' of said upper and lower coupling flanges 10, 10'. In this connection, the fastening action of the setting screws 60 will force the gland pipe portions 22, 22' of said first and second gland members 20, 20' to move forward into the larger openings of the stuffing boxes 13, 13' of said upper and lower flange coupling members 10, 10' until the gland pipe portions 22, 22' are tightly held by the packing rings 42 of said gland packing members 40, 40' against the tapered shoulders 131, 131' of said stuffing boxes 13, 13', resulting in the achievement of the second protective level of the preferred embodiment. (It shall be noted that since the tapered edges 220, 220' of said gland pipe portions 22, 22', together with the gland packing members 40, 40', are respectively formed in conjunction with the tapered shoulders 131 of said stuffing boxes 13, 13', the fastening of the setting screws 60 will force said gland packing members 40 to form a tight seal around the external wall of said sight flow tube 30, as shown in FIG. 4, to obtain 100% sealing effect therewith.)

In addition to the ooze and leak-preventive effectiveness of the preferred embodiment, the two protective levels as described above, can also provide an effective protection against the expansion and contraction of said transparent sight flow tube 30 under hot and cold conditions so as to achieve a zero-defect leakage protection therewith. On the other hand, since known transparent sight flow tubes are usually made of glass or other fragile materials, cracks may accidentally occur therein, incurring a dangerous situation. That is why the outer periphery of said transparent sight flow tube 30 is provided with a transparent protective layer of a thin film of PCTFE (polychlorotrifluoroethylene), the trade name of which is "Teflon," so as to achieve a third protective level in the preferred embodiment. In case cracking occurs at the inside portion of said transparent sight flow tube 30, the outer protective layer of PCTFE can prevent the liquid therein from oozing out therefrom, offering sufficient time for the maintenance and repair persons concerned to make the appropriate replacement. (It is to be noted that since the preferred embodiment is designed to be used in a low-pressure piping arrangement of 5–10 kg/cm², the intensity of said protective layer of PCFTE is strong enough to check any leakage from the inner cracks of said sight flow tube 30.)

While a preferred embodiment has been illustrated and described, it will be apparent that many changes and modifications may be made in the general construction and arrangement of the present invention without departing from the spirit and scope thereof. Therefore, it is desired that the present invention be not limited to the exact disclosure but only to the extent of the appended claims.

What is claimed is:

1. A sight flow indicating apparatus useful in piping arrangements comprising,
    a transparent sight flow tube having two opposite ends,
    two stuffing boxes each of which has one open end with a flange plate and an other open end with a joint flange, said other open end of each of said stuffing boxes respectively receiving the ends of said transparent sight flow tube,
    two gasket members in each of said stuffing boxes for providing a seal between each of said ends of said transparent sight flow tube and each of said stuffing boxes,
    A plurality of bolts fastening together said joint flanges to hold said gasket members tightly against said two ends of said transparent sight flow tube.
    two gland members respectively associated with said stuffing boxes and each having a gland pipe portion sleeved around an adjacent end of said transparent sight flow tube and being partially inserted in said other end of its associated stuffing box, said gland pipe portion of each gland member having a pair of radially extending and diametrically opposed lugs;
    gland packing means located between each of said stuffing boxes and its associated gland member, said gland packing means receiving said transparent sight flow tube to provide a seal around said tube at each of said stuffing boxes; and
    a plurality of screws fastening said lugs to said joint flanges to hold said gland members tightly against said joint flanges and to hold said gland packing means tightly between said gland members and said stuffing boxes.

2. A sight flow indication apparatus as claimed in claim 1, wherein each of said stuffing boxes has a first annular shoulder adjacent to said other open end, and a second annular shoulder arranged inwardly of said first annular shoulder and having a diameter smaller than that of said first annular shoulder.

3. A sight flow indication apparatus as claimed in claim 1 wherein each of said gland packing means located between said first annular shoulder of each of said stuffing boxes and an end of said gland pipe portion of each of said gland members, and each of said gasket members is located between said second annular shoulder of each of said stuffing boxes and one of said ends of said transparent sight flow tube.

4. A sight flow indication apparatus as claimed in claim 3, wherein each of said gland packing means includes more than one packing ring.

5. A sight flow indication apparatus as claimed in claim 4, wherein said transparent sight flow tube is provided with a protective coating layer of polychlorotrifluoroethylene so as to retard the leakage through said transparent sight flow tube upon cracking.

* * * * *